United States Patent

Yokosawa et al.

[11] Patent Number: 6,001,479
[45] Date of Patent: *Dec. 14, 1999

[54] MAGNETIC RECORDING MEDIUM AND METHOD FOR MANUFACTURING THE SAME

[75] Inventors: Teruhisa Yokosawa; Shinji Shirai; Katsuya Masuda; Yoichi Tei; Mihoyo Iwase, all of Nagano, Japan

[73] Assignee: Fuji Electric Co., Ltd, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/656,873

[22] Filed: May 30, 1996

[30] Foreign Application Priority Data

May 30, 1995 [JP] Japan .............................. PA 7-131370
Mar. 1, 1996 [JP] Japan .............................. PA 8-044358

[51] Int. Cl.⁶ .................................................. G11B 5/71
[52] U.S. Cl. .................. 428/408; 428/422; 428/694 TC; 428/694 TF; 428/900; 427/130; 427/131
[58] Field of Search .................. 428/694 TC, 694 TF, 428/422, 900, 408; 427/130, 131

[56] References Cited

U.S. PATENT DOCUMENTS

| | | | |
|---|---|---|---|
| 4,188,434 | 2/1980 | Loran | 428/65 |
| 4,522,885 | 6/1985 | Funahashi et al. | 428/422 |
| 4,595,640 | 6/1986 | Cheunega | 428/695 |
| 4,735,848 | 4/1988 | Kondo et al. | 428/219 |
| 4,786,544 | 11/1988 | Saito | 428/143 |
| 4,960,609 | 10/1990 | Homola et al. | 427/38 |
| 5,162,163 | 11/1992 | Ohta et al. | 428/695 |
| 5,489,480 | 2/1996 | Usuki et al. | 428/421 |
| 5,536,425 | 7/1996 | Kondo et al. | 252/62.51 R |

OTHER PUBLICATIONS

Caporiccio, "A New Series of Lubricants for Magnetic Recording Media from Bifunctional Perfluoropolyether Derivitives" Symposium on Memory & Advanced Recording Technologies, May 1986.

*Primary Examiner*—Stevan A. Resan
*Attorney, Agent, or Firm*—Rossi & Associates

[57] ABSTRACT

A magnetic recording medium having a carbon protective layer for protecting a magnetic layer formed on a nonmagnetic base includes a liquid lubrication layer formed by coating on the carbon protective layer. The liquid lubrication layer includes a hydrocarbon containing lubricant and a perfluoropolyether containing lubricant.

10 Claims, 1 Drawing Sheet

MAGNETIC RECORDING MEDIUM AND METHOD FOR MANUFACTURING THE SAME

FIELD OF THE INVENTION

The present invention relates to a magnetic recording medium to be mounted in an external memory of a computer, for example, and a method for manufacturing such a recording medium. In particular, this invention is concerned with desirable kinds of a liquid lubricant with which a top surface of the recording medium is coated.

BACKGROUND OF THE INVENTION

A known magnetic recording medium for use with a fixed magnetic disc drive is constructed as shown in FIG. 2 by way of example. To produce such a recording medium, a non-magnetic metal layer 12 is formed on a non-magnetic substrate 11, to provide a non-magnetic base 1, and a non-magnetic metal base layer 2 is laminated on the base 1. On the non-magnetic metal base layer 2 is then formed a thin film of magnetic layer 3 made of a ferromagnetic alloy, such as Co—Cr—Ta (cobalt—chromium—tantalum), or Co—Cr—Pt (cobalt—chromium—platinum). Further, a carbon protective layer 4 is formed on the magnetic layer 3, and a lubrication layer 5 made of a liquid lubricant is applied by coating onto the carbon protective layer 4, to thus form a magnetic disc.

The non-magnetic base 1 may be an alumite base, a glass base, or a ceramic base, or may be obtained by forming the non-magnetic metal layer 12 made of Ni—P on the non-magnetic substrate 11 made of an Al—Mg alloy by electroless plating. The base 1 may be ground, or formed with minute protrusions and recesses by texturing. The non-magnetic base 1 thus obtained is fed through a furnace under an Ar atmosphere, while being heated to about 200° C., so that the non-magnetic metal base layer 2 made of Cr, magnetic layer 3, and carbon protective layer 4 made of amorphous carbon are successively formed on the base 1 by sputtering. The carbon protective layer 4 is then coated with a lubricant containing perfluoropolyether (perfluoro polyester).

When the above-described magnetic recording disc is installed in the fixed magnetic disc drive that employs a contact-start-stop (CSS) system to read and write information, the magnetic disc is repeatedly brought into contact with a recording head of the disc drive during the CSS operation. In this CSS system, the recording head is in contact with a surface of the magnetic disc while the disc drive is not operated, and, only when the drive is operated, the recording head floats slightly above the surface of the magnetic disc, so as to read or write information.

The carbon protective layer 4 and the lubrication layer 5 containing perfluoropolyesther are formed on the magnetic layer 3 so as to protect this layer 3 from friction due to such sliding movements of the magnetic disc relative to the recording head.

In the case of a magnetic disc having a relatively small diameter of not larger than 5 inches, the protective layer is generally made of a carbon material, which is formed into a film by sputtering under an Ar atmosphere. The carbon protective layer is favorably used since the amorphous carbon (a-C) layer formed by sputtering has relatively strong graphitic properties, and thus shows a relative low coefficient of friction under an atmosphere containing water, which is a typical property of graphite.

The carbon protective layer as described above has a sufficiently high wear resistance with respect to a conventional Mn—Zn ferrite head (Vickers hardness: about 650), and is highly resistant to the friction between the magnetic disc and the head during a CSS operation. This carbon protective layer, however, has a lower hardness than a ceramic material (Vickers hardness: about 2000), such as $Al_2O_3.Ti$ or $CaTiO_3$, which is used for a slider of a thin-film head or MIG head employed in recent fixed magnetic disc drives. Thus, the protective layer tends to wear due to contact with the recording head formed of such a ceramic material, and the head may crash in some cases. To solve these problems, the protective layer used in recent years has developed properties similar to those of diamond having extremely high hardness, to provide a diamond-like carbon (DLC) protective layer in which the percentage of carbon atoms bonded in a diamond structure is higher than that of carbon atoms bonded in a graphite structure.

As a liquid lubricant, there has been used a perfluoropolyether containing lubricant having polar terminal groups, so as to prevent contaminants from being adsorbed onto adsorption sites (functional groups) appearing on the surface of the carbon (DLC) protective layer. If the molecular weight of perfluoropolyether is too low, the chain molecule has a small length, and the coefficient of friction is undesirably increased. If the molecular weight is too high, the chain molecule tends to have an excessively long free end, and the head tends to adhere to the lubrication layer. In view of these, the weight average molecular weight of the perfluoropolyether containing lubricant is favorably within the range of about 2000–5000 MW (molecular weight), and the length of the chain molecule is experimentally controlled to about 30 Å. Since the use of a lubrication layer having a large thickness may induce the recording medium to absorb an excessive lubricant on the medium surface, the thickness of the lubrication layer is desirably controlled to several dozens of angstroms (Å) that is about equal to the length of one molecule. If the carbon protective layer is coated with the lubricant, with a thickness substantially equal to the length of one molecule of the lubricant having a relatively large molecular weight, it is difficult to uniformly cover the entire area of the protective layer with the lubrication layer having such a thickness. As a result, uncovered areas or gaps are left between the macromolecules of the lubricant.

Further, the residue (on the side of the free end) of the molecule of the perfluoropolyether containing lubricant, other than the terminal group bonded to the adsorption site on the surface of the carbon protective layer, has a hydrophobic property. When the carbon protective layer is coated with the lubricant, therefore, the contact angle with water (as measured by a liquid-drop method for measuring the surface tension) is around 90°, namely, the coated surface of the recording medium has a large surface tension, and shows poor wettability on the surface of the carbon protective layer. In the presence of the above-described gaps between the molecules of the lubricant, the top surface of the magnetic recording medium, when closely observed, includes mutually isolated molecules of the liquid lubricant having hydrophobic surfaces, which are dispersed on the surface of the carbon protective layer.

In the meantime, recent magnetic disc drives using the magnetic recording medium as described above have a completely enclosed structure wherein the interior space is isolated or sealed from the exterior. Due to this structure, the interior space is easily filled up with gases generated from components inside the disc drive. When the magnetic disc drive is used under a condition of high humidity, in particular, the gases from the interior components are likely to be dissolved into water generated due to the high humidity or dew formation, to thereby produce acids. These gases can be easily identified by analyzing the components inside the magnetic disc drive by gas chromatography. As a result of such an analysis, gases of oxalic acid, formic acid, organic acids, such as acrylic acid, and inorganic acids, such as $SO_2$ and Cl were detected.

If the magnetic recording medium is used under the atmosphere as described above, the acid gases are first adsorbed or attached to gap portions of the medium surface between the molecules of the lubricant, and are dissolved into adsorbed water under a condition of high humidity, to produce acids. Once the density of the acids becomes higher than a predetermined level, the acids act on ether linkages of the perfluoropolyether forming the lubricant, causing oxidation and reduction, whereby the chain molecules having a high molecular weight are decomposed into low molecules of oxalic acid or formic acid. As a result of the decomposition of the liquid lubricant into low molecules, the adhesiveness between the liquid lubricant and the medium surface is lowered or eliminated, and the lubricant is more likely to be transferred to the magnetic head. Consequently, the magnetic head is contaminated, and its floating characteristics are affected (the floating height is increased), with a result of deterioration of the reproducing capability of the head. Further, the lubricant thus formed into low molecules does not maintain desired lubricating characteristics any longer, and the magnetic head may crash due to its contact with the recording medium in the worst case.

SUMMARY OF THE INVENTION

It is therefore an object of the present invention to provide a magnetic recording medium in which gaps between molecules of a lubricant are eliminated, whereby the lubricant is prevented from being decomposed into low molecules, even within an enclosed space filled with an atmosphere containing acid gases, thus maintaining stable lubricating characteristics for a long period of time. It is another object of the invention to provide a method for manufacturing such a recording medium as described above.

The above-indicated object may be attained according to a first aspect of the present invention, which provides a magnetic recording medium comprising: a non-magnetic base; a magnetic layer formed on the non-magnetic base; a carbon protective layer formed on the magnetic layer for protection thereof; a liquid lubrication layer formed by coating on the carbon protective layer, the liquid lubrication layer comprising a hydrocarbon containing lubricant, and a perfluoropolyether containing lubricant.

The liquid lubrication layer does not have a complete two-layer structure in which a first layer of the hydrocarbon containing lubricant and a second layer of the perfluoropolyether containing lubricant are superposed on each other. Rather, the lubrication layer is constructed such that the perfluoropolyether containing lubricant is deposited on mutually isolated areas of the surface of the carbon protective layer, and the hydrocarbon containing lubricant is adapted to fill gaps or spaces between the mutually isolated areas on which the perfluoropolyether containing lubricant is deposited. The lubrication layer may include partial or local areas where the two kinds of lubricants are superposed on each other.

Generally, the perfluoropolyether containing lubricant has molecules each having opposite terminal groups at least one of which is a polar terminal group, and having a weight average molecular weight in a range of 2000 to 5000 MW. It is, however, more important to appropriately select a kind of the hydrocarbon containing lubricant. Preferably, each molecule of the hydrocarbon containing lubricant includes at least one ester linkage, and has a weight average molecular weight of about 350 to 900 MW. More specifically, fatty acid esters having one or two or more ester linkage(s) are used as the hydrocarbon containing lubricant. The pour point of the fatty acid esters is not higher than 0° C. The viscosity of the fatty acid esters is in the range of about 5 to 50 sct at about 40° C. It is also preferable that the lubrication layer have about 30 to 70% of the hydrocarbon containing lubricant.

The magnetic recording medium as described above may be manufactured by employing one of the following methods for coating the carbon protective layer with the lubricant.

According to the first method, a surface of the carbon protective layer is coated with a hydrocarbon containing lubricant by dipping, and the coated surface is then coated with a perfluoropolyether containing lubricant by spin coating. According to the second method, the surface of the carbon protective layer is coated with a perfluoropolyether containing lubricant, and the coated surface is then subjected to buffing, using a buff tape that is impregnated with a hydrocarbon containing lubricant. According to the third method, the surface of the carbon protective layer is coated with a hydrocarbon containing lubricant by spin coating, and the coated surface is then coated with a perfluoropolyether containing lubricant by spin coating. According to the fourth method, the surface of the carbon protective layer is coated with a hydrocarbon containing lubricant, and the surface coated with the hydrocarbon containing lubricant is irradiated with infrared rays and heated, before coating of the surface with a perfluoropolyether containing lubricant.

Upon coating of the medium surface with the hydrocarbon containing lubricant having a small molecular weight, the lubricant covers the entire area of the medium surface, and even fills gaps or spaces between adjacent molecules of the perfluoropolyether containing lubricant having a large molecular weight. This occurs because the molecules of the perfluoropolyether containing lubricant have relatively heavy F atoms whereas the molecules of the hydrocarbon containing lubricant have a high percentage of relatively light H atoms, which make it easy for the latter lubricant to fill the gaps between the adjacent molecules of the perfluoropolyether lubricant. Thus, the hydrocarbon containing lubricant covers the surface areas that are not covered by mutually isolated films of the perfluoropolyether containing lubricant, without increasing the thickness of the lubrication layer. Accordingly, the medium surface is protected against gases generated in a magnetic disc drive, and is less likely to adsorb harmful acid gases, due to reduction in exposed surface areas of the carbon protective layer. Consequently, the molecules of the perfluoropolyether containing lubricant are less likely to be decomposed, thus assuring stable lubricating characteristics for a prolonged period of time.

With the medium surface covered with the hydrocarbon containing lubricant having a small molecular weight, the contact angle of the medium surface (as measured by a liquid-drop method for measuring the surface tension) can be reduced, so as to eliminate locally hydrophobic portions and slightly hydrophilic portions. Accordingly, the adsorbed water is prevented from being concentrated on local areas of the medium surface, and acids are dispersed over the entire surface area, without increasing the density thereof, so as to form a surface phase on the medium. This also contributes to maintaining good lubricating capability for a prolonged period of time.

If fatty acid ester having a plurality of ester linkages is used as the hydrocarbon containing lubricant, in particular, the carbon surface of the recording medium is likely to physically adsorb portions of the lubricant having the ester linkages, thus assuring increased wettability and lubricating capability.

In a preferred coating method for forming the lubrication layer, the surface of the carbon protective layer is first coated with the hydrocarbon containing lubricant, and the surface thus coated is then heated by infrared irradiation, before coating of the perfluoropolyether containing lubricant. This heat treatment accelerates volatilization of the solvent of the hydrocarbon containing lubricant, to achieve a constant thickness of the lubrication layer, which leads to improved wear resistance of the medium during the CSS operation of the disc drive, for example.

BRIEF DESCRIPTION OF THE DRAWINGS

The invention will be described in greater detail with reference to the accompanying drawings, wherein.

DETAILED DESCRIPTION OF THE PRESENT INVENTION

There will be described some examples of the present invention, referring to the accompanying drawings.

Figure 2:
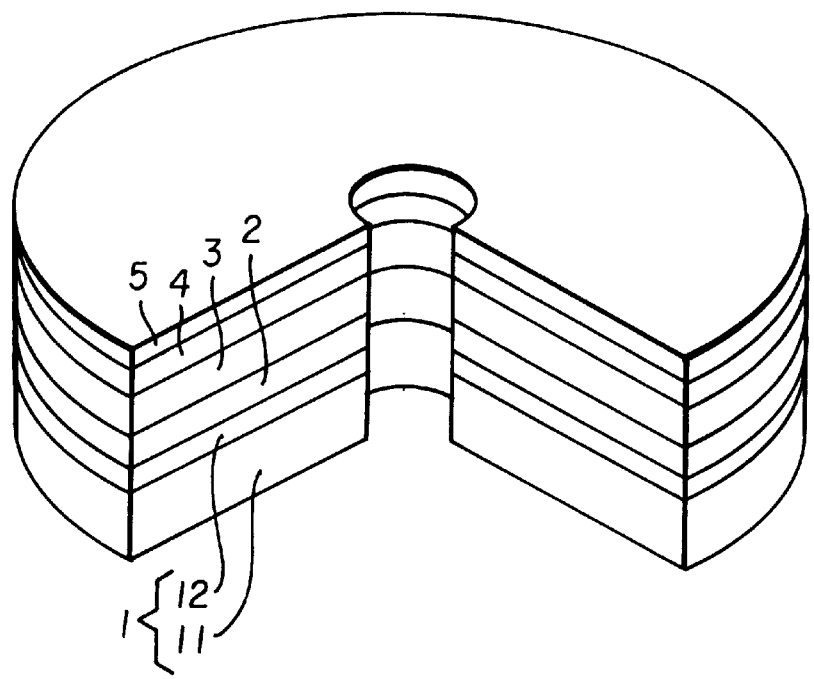
FIG. 2 is a schematic perspective view showing a general layered structure of a magnetic recording medium.

Initially, a substrate 11 made of an aluminum alloy (Al—Mg alloy) was prepared, and a 13 μcm-thickness non-magnetic layer 12 made of Ni—P was then formed on the substrate 11 by electroless plating, as shown in FIG. 2. The surface of the non-magnetic layer 12 was then ground by polishing to achieve a surface roughness: Ra of 10 Å, and substantially concentric grooves were formed by texturing in the same surface, using diamond slurry, so that the surface roughness: Ra of the non-magnetic layer 12 became equal to 40 Å. After cleaning this substrate, a 500 Å-thickness non-magnetic metal base layer 2 made of Cr, a 300 Å-thickness magnetic layer 3 made of $Co_{82}Cr_{14}Ta_4$, and a 150 Å-thickness protective layer 4 made of diamond-like carbon (DLC) were successively formed on the substrate by sputtering. Thereafter, tape burnishing was effected on the substrate having the layers 2, 3, 4 formed thereon by sputtering. In the following examples, the thus obtained magnetic recording medium was used as a common medium to which various kinds of liquid lubricants as described below were applied by coating.

EXAMPLE 1

Initially, each specimen of hydrocarbon containing liquid lubricants as indicated in TABLE 1-A was diluted in a concentration of 0.02 wt % in a solvent, dichloromethane, and the surface of the above recording medium was coated by dipping with this lubricant, at a lifting speed of 1 mm/sec. In the second step of coating, a perfluoropolyether containing lubricant having a weight average molecular weight of about 4000 MW and including hydroxyl groups as polar terminal groups was diluted in a concentration of 0.05 wt % in a solvent, perfluorooctane. The medium surface was then coated with this lubricant by spin coating, at a rotation speed of 1800 rpm, so that the perfluoropolyether layer formed on the surface had a thickness of 16 Å.

To produce a comparative example, a perfluoropolyether containing lubricant having a weight average molecular weight of about 4000 MW and including hydroxyl groups (OH) as polar terminal groups was diluted in a concentration of 0.05 wt % in a solvent, perfluorooctane. The medium surface was then coated with this lubricant by dipping, at a lifting speed of 1 mm/sec., so that the lubrication layer 5 formed on the medium surface had a thickness of 18 Å.

TABLE 1-A

| Lubricant | Characteristics | | |
|---|---|---|---|
| | Molecular weight MW | Viscosity sct (40° C.) | Pour point (° C.) |
| n butyl stearate | 340 | 15.5 | 24.5 |
| dioctyl sebacate | 426 | 25.0 | 10.0 |
| fatty acid ester 1 (MB-816) | 350 | 8.1 | 0 |
| fatty acid ester 2 (MB-871) | 380 | 9.1 | −5.0 |
| fatty acid ester 3 (H-334 R) | 500 | 19.9 | −40.0 |
| fatty acid ester 4 (H-310) | 700 | 25.0 | −10.0 |
| fatty acid ester 5 (H-381 R) | 900 | 48.3 | −30.0 |
| fatty acid ester 6 (H-407 R) | 600 | 21.9 | −40.0 |
| fatty acid ester 7 (H-4812R) | 800 | 44.0 | −22.5 |
| perfluoropolyether containing lubricant (Comparative Example) | — | — | — |

Each of the magnetic recording media having the above-indicated specimens of lubricants and that of Comparative Example was installed in an actual magnetic disc drive, and was subjected to a test in which the disc drive was operated to repeat CSS motions for 200 hours at 60° C., in an atmosphere having a humidity of 80%RH. In the test, the coefficient of friction of the recording medium was measured, and contamination of a magnetic head of the disc drive was observed upon termination of the CSS operation. The hydrocarbon containing lubricants used in this test are n butyl stearate, dioctyl sebacate, fatty acid ester 1 (UNISTER-MB-816 available from Nippon Oil and Fats Co., Ltd.), fatty acid ester 2 (UNISTER-MB-871 available from Nippon Oil and Fats Co., Ltd.), fatty acid ester 3 (UNISTER-H-334 R available from Nippon Oil and Fats Co., Ltd.), fatty acid ester 4 (UNISTER-H-310 available from Nippon Oil and Fats Co., Ltd.), fatty acid ester 5 (UNISTER-H-381 R available from Nippon Oil and Fats Co., Ltd.), fatty acid ester 6 (UNISTER-H-407 R available from Nippon Oil and Fats Co., Ltd.), and fatty acid ester 7 (UNISTER-H-4812R available from Nippon Oil and Fats Co., Ltd.).

While a molecule of fatty acid ester is generally represented by RCOOR' where R and R' are alkyl groups, the fatty acid ester used in this example has one ester linkage in one molecule, and is represented by the following structural formula:

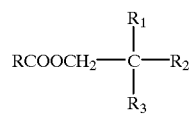

where R, $R_1$, $R_2$ and $R_3$ represent alkyl groups.

TABLE 1-B

|  | Test results | | |
| --- | --- | --- | --- |
| Lubricant | Coating condition | Resistance to CSS motions | Head contamination |
| n butyl stearate | poor * | poor | contaminated |
| dioctyl sebacate | poor * | poor | contaminated |
| fatty acid ester 1 (MB-816) | good | acceptable | no contamination |
| fatty acid ester 2 (MB-871) | good | good | no contamination |
| fatty acid ester 3 (H-334 R) | good | good | no contamination |
| fatty acid ester 4 (H-310) | good | good | no contamination |
| fatty acid ester 5 (H-381 R) | good | good | little contaminated |
| fatty acid ester 6 (H-407 R) | good | good | no contamination |
| fatty acid ester 7 (H-4812R) | good | good | no contamination |
| perfluoropolyether containing lubricant (Comparative Example) | good | good | contaminated |

* White deposits appeared on the surface.

When n butyl stearate or dioctyl sebacate was used as a low-molecule lubricant used with the perfluoropolyether containing lubricant, white deposits appeared on the coated surface of the recording medium, and the coating condition was poor, as indicated in TABLE 1-B. In addition, the recording medium showed poor resistance to the CSS motions of the disc drive, and the magnetic head was contaminated.

When the fatty acid esters 1–7 were used as a low-molecule hydrocarbon containing lubricant, on the other hand, the coated surface of the recording medium showed a good coating condition, high wear resistance during the CSS operation of the disc drive, and the magnetic head was not contaminated after the CSS operation. The coating with the hydrocarbon containing lubricant having a smaller molecular weight than the perfluoropolyether containing lubricant yields the above effects, since the entire area of the medium surface is covered with the lubricant having such a thickness that does not cause adhesion thereof with the magnetic head, with the hydrocarbon containing lubricant filling gaps between molecules of the high-molecular-weight perfluoropolyether, thereby preventing adsorption of acid gases on the medium surface.

Of the above-indicated fatty acid esters 1 through 7, the use of fatty acid ester 1 (viscosity: 8.1 sct, pour point: 0° C.) having the lowest molecular weight (350 MW) resulted in an undesirably high coefficient of friction, and reduced wear resistance of the recording medium during the css operation, due to the lowness of the molecular weight. To the contrary, the use of fatty acid ester 5 (viscosity: 48.3 sct, pour point: −30.0° C.) having the highest molecular weight (900) resulted in contamination of the magnetic head. It was therefore found that the weight average molecular weight of the fatty acid ester is preferably within a range of about 350 to 900 MW. It is also noted from TABLE 1-A that the pour points of the fatty acid esters are not higher than 0° C. whereas the pour points of n butyl stearate and dioctyl sebacate are higher than 0°. It is thus preferable to use a hydrocarbon containing lubricant having a pour point of not higher than 0° C. It is also preferable that the viscosity of fatty acid ester is held within the range of about 5 to 50 sct at about 40° C.

EXAMPLE 2

In the first step of a coating process of this example, a perfluoropolyether containing lubricant having a weight average molecular weight of about 4000 MW and containing hydroxyl groups (OH) as polar terminal groups was diluted in a concentration of 0.05 wt % in a solvent, perfluorooctane. The surface of the recording medium was then coated with the lubricant by dipping, at a lifting speed of 1 mm/sec, so that the resulting lubrication layer had a thickness of 18 Å. In the next step, each specimen of the hydrocarbon containing lubricants as indicated in TABLE 1-A was diluted in a concentration of 0.02 wy % in isopropyl alcohol (IPA). With the diluted lubricant impregnated into a buff tape, the medium surface was subjected to buffing using the tape while being rotated at a speed of 200 rpm.

Figure 1:
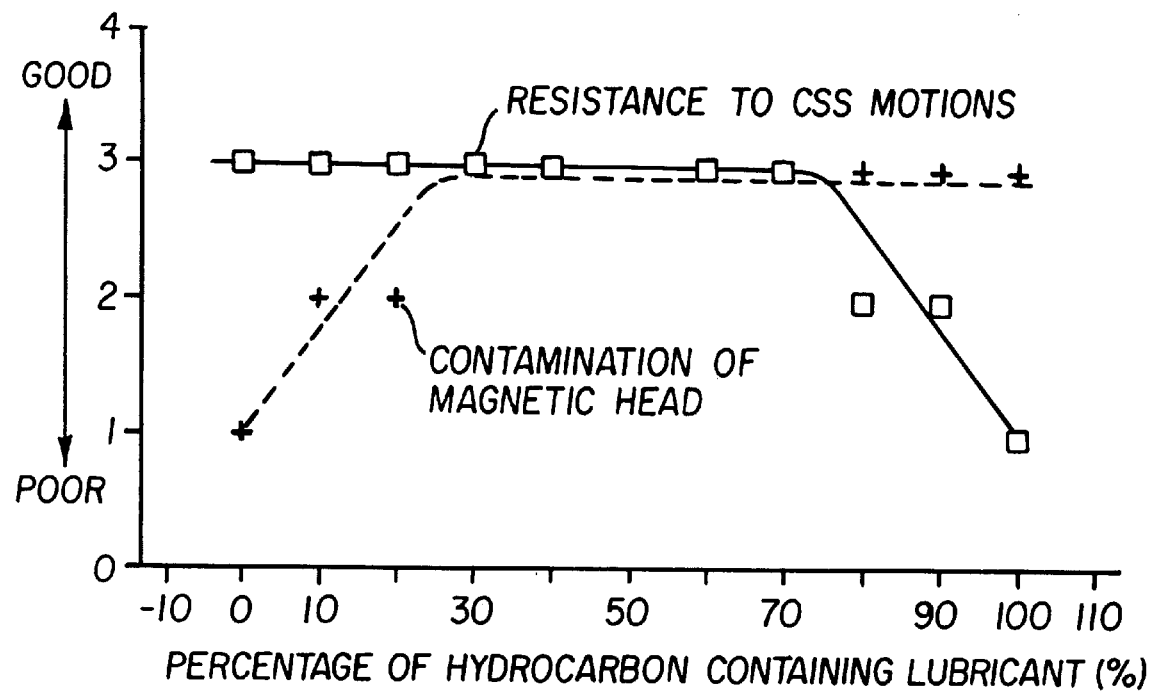
FIG. 1 is a graph indicating a relationship between the percentage of a hydrocarbon containing lubricant contained in a lubrication layer of a magnetic recording medium, and the wear resistance of the recording medium during a CSS operation of a magnetic disc drive and contamination of a magnetic head.

The graph of FIG. 1 shows the relationship between the percentage of the hydrocarbon containing lubricant contained the lubrication layer that also contains the perfluoropolyether containing lubricant, and the wear resistance of the medium during the CSS operation and contamination of the magnetic head. The percentage of the hydrocarbon containing lubricant was varied by changing the thickness of the lubrication layer formed in the manner as described above. In this test, the obtained magnetic recording medium was installed in an actual magnetic disc drive, and the disc drive was operated to repeat CSS motions for 200 hours at 60° C., in an atmosphere having a relative humidity of 80% RH, in the same manner as in EXAMPLE 1. Upon termination of the CSS operation, the coefficient of friction of the recording medium was measured, and contamination of the magnetic head of the disc drive was observed. It is apparent from FIG. 1 that the recording medium exhibited sufficiently high resistance in the CSS operation, and the magnetic head was free from contamination, when 30 to 70% of the hydrocarbon containing lubricant was contained in the lubrication layer.

EXAMPLE 3

Initially, each specimen of hydrocarbon containing lubricants of fatty acid esters as indicated in TABLE 2-A was diluted in a concentration of 0.05 wt % in chlorofluorocarbon (e.g., ASAHIKLIN AK-225 available from Asahi Glass Company) dichloromethane as a solvent. The surface of the recording medium was then coated with the lubricant by spin coating while the medium was rotated at a speed of 1600 rpm, so that the coating had a thickness of 10 Å. Thereafter, each specimen of perfluoropolyether containing lubricants as indicated in TABLE 2-A was diluted in a concentration of 0.05 wt % in fluorocarbon (e.g., FC-77 available from Sumitomo 3M Limited) as a solvent, and the medium surface was coated with the lubricant by spin coating while the medium was rotated at a speed of 1800 rpm, so that the coating had a thickness of 20 Å. In this manner, twelve samples of magnetic recording media were produced.

TABLE 2-A

| Sample | Hydrocarbon containing lubricant | Perfluoropolyesther containing lubricant |
| --- | --- | --- |
| 1 | 2ethyl-hexanol fatty acid ester (e.g., MB-876*[1]) | 4000MW*[5], hydroxyl group as terminal group e.g., Fomblin Z-do14000*[3]) |
| 2 | polyol fatty acid ester (e.g., H-334R*[1]) Fomblin Z-do14000*[3]) | 4000MW*[5], hydroxyl group as terminal group e.g., |

TABLE 2-A-continued

| Sample | Hydrocarbon containing lubricant | Perfluoropolyester containing lubricant |
|---|---|---|
| 3 | pentaerythritol heptanate (e.g., H-407R*[1]) | 4000MW*[5], hydroxyl group as terminal group e.g., Fomblin Z-do14000*[3] |
| 4 | special hindered ester (e.g., KAO-LUB 268*[2]) | 4000MW*[5], hydroxyl group as terminal group e.g., Fomblin Z-do14000*[3] |
| 5 | adipic acid diisodecyl (e.g., VINYSIZER 50*[2]) | 4000MW*[5], hydroxyl group as terminal group e.g., Fomblin Z-do14000*[3] |
| 6 | 2ethyl-hexanol fatty acid ester (e.g., MB-876*[1]) | 3000MW*[5], piperonyl group as terminal group (e.g., Fomblin AM2001*[3]) |
| 7 | 2ethyl-hexanol fatty acid ester (e.g., MB-876*[1]) | 3000MW*[5], carboxyl group as terminal group (e.g., DEMUNUM SH*[4]) |
| 8 | 2ethyl-hexanol fatty acid ester (e.g., MB-876*[1]) | 4000MW*[5], hydroxyl group as terminal group (e.g., Fomblin Z-do14000*[3]) |
| 9 | polyol fatty acid ester (e.g., H-334R*[1]) | 4000MW*[5], hydroxyl group as terminal group (e.g., Fomblin Z-do14000*[3]) |
| 10 | special hindered ester (e.g., KAO-LUB 268*[2]) | 4000MW*[5], hydroxyl group as terminal group (e.g., Fomblin Z-do14000*[3]) |
| 11 | 2ethyl-hexanol fatty acid ester (e.g., MB-876*[1]) | 3000MW*[5], piperonyl group as terminal group (e.g., Fomblin AM2001*[3]) |
| 12 | 2ethyl-hexanol fatty acid ester (e.g., MB-876*[1]) | 3000MW*[5], carboxyl group as terminal group (e.g., DEMUNUM SH*[4]) |
| Comp. Ex.1 | None | 4000MW*[5], hydroxyl group as terminal group (e.g., Fomblin Z-dol 4000*[3]) |
| Comp. Ex.2 | None | 3000MW*[5], piperonyl group as terminal group (e.g., Fomblin AM2001*[3]) |
| Comp. Ex.3 | None | 3000MW*[5], carboxyl group as terminal group (e.g., DEMUNUM SR*[4]) |

*[1]: available from Nippon Oil and Fats Co., Ltd.
*[2]: available from Kao Corporation
*[3]: available from Monte Catini K.K.
*[4]: available from Daikin Industries Ltd.
*[5]: average molecular weight

TABLE 2-B

| Sample | Infrared heating | Friction*[1] $\mu$1 | Friction*[1] $\mu$L | CSS- $\mu$1 | CSS- $\mu$L | Head*[2] |
|---|---|---|---|---|---|---|
| 1 | No | 0.29 | 0.35 | 0.27 | 0.39 | No |
| 2 | No | 0.32 | 0.36 | 0.27 | 0.41 | No |
| 3 | No | 0.30 | 0.39 | 0.26 | 0.43 | No |
| 4 | No | 0.35 | 0.40 | 0.27 | 0.46 | No |
| 5 | No | 0.32 | 0.36 | 0.28 | 0.45 | No |
| 6 | No | 0.30 | 0.38 | 0.28 | 0.43 | No |
| 7 | No | 0.30 | 0.35 | 0.25 | 0.40 | No |
| 8 | Yes | 0.28 | 0.30 | 0.26 | 0.35 | No |
| 9 | Yes | 0.30 | 0.33 | 0.27 | 0.37 | No |
| 10 | Yes | 0.33 | 0.36 | 0.24 | 0.36 | No |
| 11 | Yes | 0.29 | 0.34 | 0.25 | 0.35 | No |
| 12 | Yes | 0.28 | 0.35 | 0.28 | 0.37 | No |
| Com. Ex. 1 | No | 0.29 | 0.45 | 0.28 | 0.41 | Yes |
| Com. Ex. 2 | No | 0.31 | 0.50 | 0.25 | 0.45 | Yes |
| Com. Ex. 3 | No | 0.33 | 0.47 | 0.27 | 0.42 | Yes |

*[1]: coefficient of dynamic friction
*[2]: contamination of magnetic head

As indicated in TABLE 2-A, 2ethyl-hexanol fatty acid ester used in Samples 1, 6–8 contains one ester linkage in one molecule, and has a weight average molecular weight of about 400 MW, and polyol fatty acid ester used in Samples 2, 9 contains two ester linkages in one molecule, and has a weight average molecular weight of about 400 to 900 MW. Pentaerythritol heptanate used in Sample 3 contains four ester linkages in one molecule, and has a weight average molecular weight of about 900 MW, and special hindered ester and adipic acid diisodecyl contain four ester linkages in one molecule, and has a weight average molecular weight of about 400 to 900 MW. The perfluoropolyether containing lubricant having piperonyl groups as terminal groups as indicated in TABLE 2-A is not a type of lubricant that chemically adsorbs functional groups, such as carboxyl group or hydroxyl group, on the carbon surface, but another type of lubricant whose piperonyl groups similar to benzene rings are physically adsorbed onto the carbon surface.

Samples 8–12 of TABLE 2-A were subjected to heat treatment of infrared radiation at 100° C. for 30 min., using an infrared lamp heater, after coating of the hydrocarbon containing lubricant.

The coefficient of dynamic coefficient $\mu$1 as indicated in TABLE 2-B was measured when a magnetic head having a head load of 10 gf was slid on the surface of each magnetic recording medium produced according to Samples 1–12 and Comparative Examples 1–3 of TABLE 2-A, at a rotating speed of 1 rpm, while the head is located 2.15 mm away from the center of the medium in the radial direction. After sliding the magnetic head on the medium surface for one hour at a rotating speed of 100 rpm, the coefficient of dynamic friction $\mu$L was measured with the head being slid on the medium surface at a speed of 1 rpm. Further, each specimen of the magnetic recording media as indicated in TABLE 2-A was incorporated into an actual magnetic disc drive, and the coefficient of friction $\mu$1 represented as CSS-$\mu$1 in TABLE 2-B was measured. After the magnetic disc drive repeated CSS (contact-start-stop) motions for 200 hours at a temperature of 60° C. and a humidity of 80% RH, the coefficient of friction $\mu$L represented as CSS-$\mu$L in TABLE 2-B was measured, and contamination of the magnetic head was observed. The results of the measurements and observation are indicated in TABLE 2-B.

It is understood from TABLE 2-B that the magnetic recording media of Samples 1–12 coated with both the hydrocarbon containing lubricant and the perfluoropolyether containing lubricant had relatively low coefficients of dynamic friction $\mu$L, and relatively low coefficients of friction CSS-$\mu$L after the CSS operation of the magnetic disc drive, and no contamination of the magnetic head was observed. With regard to the recording media of Samples 8–12 that were subjected to infrared heat treatment after coating of the respective hydrocarbon containing lubricants, in particular, it was found that the coefficient of dynamic friction $\mu$L and CSS-$\mu$L were significantly reduced, as compared with those of the other samples and comparative examples. This may be because the infrared heat treatment accelerates volatilization of the solvent of the hydrocarbon containing lubricant, whereby the resulting coating of the hydrocarbon containing lubricant is formed with a constant thickness. It was thus found effective and advantageous to carry out the infrared heat treatment after coating of the hydrocarbon containing lubricant.

It is to be particularly noted that polyol fatty acid ester, pentaerythritol heptanate, special hindered ester and adipic acid diisodecyl used in Samples 2–5, 9 and 10 are fatty acid esters having two ester linkages in one molecule. As compared with the fatty acid esters having one ester linkage in one molecule as used in Example 1, the use of the above fatty acid esters having two ester linkages leads to increased wettability and improved lubricating capability, since the carbon surface of the magnetic recording medium is likely to physically adsorb the fatty acid esters at their portions having the ester linkages.

On the other hand, the magnetic media of Comparative Examples 1–3 coated only with the perfluoropolyether containing lubricant showed relatively high coefficients of dynamic friction $\mu L$, and relatively high coefficients of friction CSS-$\mu L$ after the CSS operation of the magnetic disc drive, and the magnetic head used with each of these magnetic media was contaminated.

While the perfluoropolyether containing lubricants used in the present example have any one of hydroxyl group, piperonyl group and carboxyl group as a polar terminal group of each molecule, a mixture of two or more kinds of the above-indicated groups may be used as the terminal group of the perfluoropolyether containing lubricant.

As explained above, the present invention is characterized in that the surface of the magnetic recording medium is coated with the hydrocarbon containing lubricant having a low molecular weight, as well as the perfluoropolyether containing lubricant having a high molecular weight. This feature yields the following effects.

The low-molecular-weight hydrocarbon containing lubricant covers the entire medium surface, and fills gaps or spaces between the molecules of the high-molecular-weight perfluoropolyether containing lubricant. Accordingly, the medium surface is protected against gases generated in the disc drive, and is thus prevented from adsorbing harmful acid gases.

Consequently, the perfluoropolyether is less likely to be decomposed, assuring stable lubricating characteristics for a prolonged period of time. With the entire medium surface covered with the hydrocarbon containing lubricant having a small molecular weight, the adsorbed water is prevented from being concentrated in local areas of the medium surface, and acids are dispersed over the entire surface area, without increasing the density thereof, so as to form a surface phase on the medium. This also contributes to maintaining good lubricating capability for a prolonged period of time.

In particular, the use of fatty acid ester having a plurality of ester linkages as the hydrocarbon containing lubricant is advantageous since the carbon surface of the recording medium is likely to physically adsorb portions of the lubricant having ester linkages, thus assuring increased wettability and lubricating capability.

In a preferred coating method for forming the lubrication layer, the surface of the carbon protective layer is first coated with the hydrocarbon containing lubricant, and the surface thus coated is then heated by infrared irradiation, before coating of the perfluoropolyether containing lubricant. This heat treatment accelerates volatilization of the solvent of the hydrocarbon containing lubricant, to achieve a constant thickness of the lubrication layer, which leads to improved wear resistance of the medium during the CSS operation of the disc drive, for example.

What is claimed is:

1. A magnetic recording medium comprising:
   a non-magnetic base;
   a magnetic layer formed on said non-magnetic base;
   a carbon protective layer formed on said magnetic layer for protection thereof; and
   a liquid lubrication layer formed by coating on said carbon protective layer, said liquid lubrication layer comprising a fatty acid ester lubricant, and a perfluoropolyether lubricant, wherein the perfluoropolyether lubricant is deposited on mutually isolated areas of the surface of the carbon protective layer and the fatty acid ester lubricant fills gaps between the mutually isolated areas;
   wherein said fatty acid ester lubricant comprises molecules each having at least one ester linkage, and a weight average molecular weight in a range of 350 to 900; and
   wherein said perfluoropolyether lubricant comprises molecules each having opposite terminal groups at least one of which is a polar terminal group, and having a weight average molecular weight in a range of 2000 to 5000.

2. A magnetic recording medium as defined in claim 1, wherein said fatty acid ester has a pour point of not higher than 0° C.

3. A magnetic recording medium as defined in claim 1, wherein said fatty acid ester has a viscosity in a range of 5 to 50 sct at 40° C.

4. A magnetic recording medium as defined in claim 1, wherein said liquid lubrication layer has 30 to 70% of said hydrocarbon containing lubricant.

5. A magnetic recording medium as claimed in claim 1, wherein said fatty acid ester lubricant has two ester linkages.

6. A magnetic recording medium as claimed in claim 1, wherein said fatty acid ester lubricant has a plurality of ester linkages.

7. A method for manufacturing a magnetic recording medium as claimed in claim 1, comprising the steps of:
   forming a carbon protective layer for protecting a magnetic layer formed on a non-magnetic base; and
   coating said carbon protecting layer with a liquid lubrication layer, said step of coating comprising a first coating step in which a surface of said carbon protective layer is coated with a fatty acid ester lubricant by dipping, and a second coating step in which said surface coated with the hydrocarbon containing lubricant is coated with a perfluoropolyether containing lubricant by a spin coat method.

8. A method for manufacturing a magnetic recording medium as claimed in claim 1, comprising the steps of:
   forming a carbon protective layer for protecting a magnetic layer formed on a non-magnetic base; and
   coating said carbon protecting layer with a liquid lubrication layer, said step of coating comprising a first coating step in which a surface of said carbon protective layer is coated with a perfluoropolyether containing lubricant, and a second coating step in which said surface coated with the perfluoropolyether containing lubricant is subjected to buffing, using a buff tape that is impregnated with a fatty acid ester lubricant.

9. A method for manufacturing a magnetic recording medium as claimed in claim 1, comprising the steps of:
   forming a carbon protective layer for protecting a magnetic layer formed on a non-magnetic base; and
   coating said carbon protecting layer with a liquid lubrication layer, said step of coating comprising a first coating step in which a surface of said carbon protective layer is coated with a fatty acid ester lubricant by spin coating, and a second coating step in which said surface coated with the fatty acid ester lubricant is coated with a perfluoropolyether lubricant by spin coating.

10. A method for manufacturing a magnetic recording medium as claimed in claim 1, comprising the steps of:
    forming a carbon protective layer for protecting a magnetic layer formed on a non-magnetic base; and coating said carbon protecting layer with a liquid lubrication layer, said step of coating comprising a first coating step in which a surface of said carbon protective layer is coated with a fatty acid ester lubricant, a heating step in which said surface coated with the fatty acid ester lubricant is irradiated with infrared rays and heated, and a second coating step in which said surface coated with the fatty acid ester lubricant and heated in said heating step is coated with a perfluoropolyether lubricant.

* * * * *